United States Patent
Schvallinger et al.

(10) Patent No.: US 11,846,194 B2
(45) Date of Patent: Dec. 19, 2023

(54) WAVY TILTING OF PLATFORMS AT THE ROTOR-STATOR GAPS IN A TURBINE ENGINE COMPRESSOR

(71) Applicant: SAFRAN AIRCRAFT ENGINES, Paris (FR)

(72) Inventors: Michaël Franck Antoine Schvallinger, Moissy Cramayel (FR); Mickael Cavarec, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 37 days.

(21) Appl. No.: 17/795,162

(22) PCT Filed: Jan. 22, 2021

(86) PCT No.: PCT/EP2021/051462
§ 371 (c)(1),
(2) Date: Jul. 25, 2022

(87) PCT Pub. No.: WO2021/148607
PCT Pub. Date: Jul. 29, 2021

(65) Prior Publication Data
US 2023/0081671 A1 Mar. 16, 2023

(30) Foreign Application Priority Data
Jan. 24, 2020 (FR) ...................................... 2000683

(51) Int. Cl.
*F01D 11/08* (2006.01)
*F01D 5/14* (2006.01)
*F01D 9/04* (2006.01)

(52) U.S. Cl.
CPC ................ *F01D 11/08* (2013.01); *F01D 5/14* (2013.01); *F01D 9/04* (2013.01);
(Continued)

(58) Field of Classification Search
CPC .... F04D 29/547; F04D 29/321; F04D 29/164; F04D 29/542; F01D 9/04; F01D 5/143;
(Continued)

(56) References Cited

U.S. PATENT DOCUMENTS

| 6,524,070 | B1 | 2/2003 | Carter |
| 9,890,641 | B2 * | 2/2018 | Potter ....................... F01D 5/02 |

(Continued)

FOREIGN PATENT DOCUMENTS

| FR | 2960604 A1 | 12/2011 |
| WO | 20100000788 A2 | 1/2010 |

OTHER PUBLICATIONS

International Search Report for PCT/EP2021/051462 dated Mar. 29, 2021.
Written Opinion for PCT/EP2021/051462 dated Mar. 29, 2021.

*Primary Examiner* — Igor Kershteyn
(74) *Attorney, Agent, or Firm* — Sandberg Phoenix & von Gontard P.C.

(57) ABSTRACT

A set of compression stage(s) of a turbomachine, forming an annular fluid passage and comprising at least one annular stator platform and/or at least one annular rotor platform having an outer longitudinal profile inclined ($I_{Si}/I_{Ri}$) inwards and upstream with respect to a nominal profile of the fluid stream, where the inclination ($I_{Si}/I_{Ri}$) of the outer longitudinal profile of the or each of the annular platforms, relative to the nominal profile of the fluid stream, oscillates along the circumference of the annular platform or platforms, between a maximum value in front of the blades of the annular platform and a minimum value between each pair of adjacent blades of the annular platform.

10 Claims, 3 Drawing Sheets

(52) U.S. Cl.
CPC .... *F05D 2220/323* (2013.01); *F05D 2240/12* (2013.01); *F05D 2240/30* (2013.01); *F05D 2240/55* (2013.01)

(58) Field of Classification Search
CPC ...... F01D 5/14; F01D 11/08; F05D 2220/323; F05D 2240/55; F05D 2240/12; F05D 2240/80; F05D 2240/30; F05D 2250/70; F05D 2250/184; Y02T 50/60
See application file for complete search history.

(56) References Cited

U.S. PATENT DOCUMENTS

| | | | |
|---|---|---|---|
| 9,976,433 B2* | 5/2018 | Praisner | F01D 11/00 |
| 10,196,897 B2* | 2/2019 | Thomas | F02K 3/06 |
| 10,240,462 B2* | 3/2019 | Venugopal | F01D 5/145 |
| 10,294,805 B2* | 5/2019 | Potter | F04D 29/321 |
| 10,344,601 B2* | 7/2019 | Turner | F01D 11/008 |
| 10,352,180 B2* | 7/2019 | Stein | F01D 9/041 |
| 10,458,426 B2* | 10/2019 | Wilkin, II | F04D 29/325 |
| 10,502,230 B2* | 12/2019 | Anderson | F01D 5/143 |
| 10,844,726 B2* | 11/2020 | Horn | F01D 5/34 |
| 2008/0310961 A1 | 12/2008 | Guemmer | |
| 2013/0156562 A1 | 6/2013 | Mahle et al. | |
| 2013/0156563 A1 | 6/2013 | Mahle et al. | |
| 2017/0218769 A1 | 8/2017 | Venugopal et al. | |
| 2019/0003323 A1 | 1/2019 | Shirley et al. | |

* cited by examiner

WAVY TILTING OF PLATFORMS AT THE ROTOR-STATOR GAPS IN A TURBINE ENGINE COMPRESSOR

CROSS-REFERENCE TO RELATED APPLICATIONS

The present invention is the US national stage under 35 U.S.C. § 371 of International Application No. PCT/EP2021/051462 which was filed on Jan. 22, 2021, and which claims the priority of application FR 2000683 filed on Jan. 24, 2020 the contents of which (text, drawings and claims) are incorporated here by reference in its entirety.

FIELD

The invention relates to the field of turbomachinery, more particularly jet thrusters for aircraft.

BACKGROUND

In a turbomachine, the annular fluid stream passing through the machine is delimited, in the compressor and the turbine, by an outer guide surface, generally formed by the casing of the machine, and an inner guide surface formed by the annular platforms of rows of rotor and stator blades alternately succeeding each other.

One of the key parameters in the performance and operability of turbomachinery compressors and turbines is the correct alignment of the inner annular platforms of the fixed and moving parts in order to ensure optimal aerodynamic guidance of the fluid stream.

However, the passage for the fluid stream is strewn with irregularities formed essentially by the blades and the air gaps between the annular platforms of rows of rotor and stator blades, disturbing the flow.

Also, the manufacturing and assembly tolerances of these various parts reconstituting this inner surface for guiding the fluid stream mean that steps, which are unfavorable from an aerodynamic point of view, may appear. The steps forming an upward step, in the direction of fluid flow, are substantially more unfavorable, from an aerodynamic point of view, than the steps forming a downward step.

The usual state-of-the-art design rules are based on these geometric considerations to achieve this good alignment of the internal guiding surface, essentially by tilting the platforms and/or by providing a rounding at the upstream edges of the platforms, so as to form descending steps in the most unfavorable configurations within manufacturing and assembly tolerances. However, this approach has limitations, essentially in that it is limited to geometric considerations, and is therefore subject to improvement with a view to optimizing the flow of the fluid stream.

SUMMARY

The object of the invention is to overcome at least one of the drawbacks of the aforementioned prior art. More particularly, the invention aims to improve the flow of the fluid stream within a compressor, in particular along the inner guide surface.

The subject of the invention is a set of compression stage(s) of a turbomachine, forming an annular passage for the fluid stream and comprising at least one alternation of rows of stator and rotor blades, with annular platforms inside the fluid vein and delimiting the vein; at least one annular stator platform and/or at least one annular rotor platform having an outer longitudinal profile inclined inwards and upstream with respect to a nominal profile of the fluid stream; remarkable in that the inclination of the outer longitudinal profile of the or each of the annular platforms, with respect to the nominal profile of the fluid stream, oscillates along the circumference of the annular platform or platforms, between a maximum value in front of the blades of the annular platform and a minimum value between each pair of adjacent blades of the annular platform.

By nominal profile of the fluid stream, we mean a profile parallel to a theoretical and perfect profile of the fluid stream, aligned with the platforms directly upstream and downstream, ensuring a perfect connection. More specifically, the nominal profile passes through the downstream edge of the annular platform, the longitudinal profile of which is inclined. Depending on the manufacturing tolerances, this nominal profile can be aligned with the upstream annular platform while remaining parallel to a theoretical and perfect profile of the fluid stream, in particular aligned with the downstream edge when the upstream annular platform also has a longitudinal profile inclined.

The at least one annular platform may be segmented. Their circumference corresponds to their envelope around the main axis.

According to an advantageous embodiment of the invention, the inclination of the outer longitudinal profile of the or each of the annular platforms, with respect to the nominal profile of the fluid stream is of a radial distance $I_{Ri}$ and/or $I_{Si}$, respectively, at an upstream edge of the outer longitudinal profile, relative to the nominal profile of the fluid stream.

According to an advantageous mode of the invention, the maximum and minimum values of radial distance $I_{Ri}$ and/or $I_{Si}$ of inclination of the outer longitudinal profile of the or each of the annular platforms, with respect to the nominal profile of the fluid stream, has a difference A between 0.05 and 0.15 mm.

According to an advantageous embodiment of the invention, the inclination of the outer longitudinal profile of the or each of the annular platforms with respect to the nominal profile of the fluid stream is achieved by a pivoting of the outer longitudinal profile around a downstream edge of the profile outer longitudinal and/or by a rounding of the upstream edge of the outer longitudinal profile.

According to an advantageous embodiment of the invention, the rounding of the upstream edge of the outer longitudinal profile of the annular platform(s) has a radius of curvature $R_{Ri}$ or $R_{Si}$, respectively, greater than 5 mm and/or less than 15 mm.

According to an advantageous embodiment of the invention, the rounding of the upstream edge of the outer longitudinal profile of the or each of the annular platforms extends over a distance greater than 20% and/or less than 30% of the total extent of the outer longitudinal profile.

According to an advantageous embodiment of the invention, the inclination of the outer longitudinal profile of the or each of the annular platforms, relative to the nominal profile of the fluid stream, oscillates along the circumference of at least one annular stator platform and of at least one annular rotor platform, the minimum inclination of the outer longitudinal profile of the at least one annular rotor platform being greater than the minimum inclination of the outer longitudinal profile of the at least one annular stator platform, respectively.

Advantageously, the minimum inclination of the outer longitudinal profile of the at least one annular rotor platform is greater than 150% of the minimum inclination of the outer longitudinal profile of the at least one annular stator platform.

According to an advantageous embodiment of the invention, the maximum value of the inclination of the outer longitudinal profile of the or each of the annular platforms is opposite the blades of the annular platform along a line of chords of the blades.

The invention also relates to a method for dimensioning at least one annular platform of a row of stator blades and/or of a row of rotor blades of a set of compression stage(s) of a turbomachine, the rows of blades being alternately and forming air gaps, the method comprising, for the or each of the annular platforms, determining, as a function of the air gap directly upstream, an inclination of an outer longitudinal profile of the annular platform inwards and upstream with respect to a nominal profile of the fluid stream; remarkable in that the inclination of the or each of the annular platforms oscillates along the circumference of the annular platform, between a maximum value in front of the blades of the annular platform and a minimum value between each pair of adjacent blades of the annular platform.

According to an advantageous embodiment of the invention, the maximum value of the inclination of the outer longitudinal profile of the or each of the annular platforms is aligned opposite the blades of the annular platform according to an orientation of the fluid stream in the air gap. directly upstream of the annular platform, at nominal operating speed.

The features of the invention are interesting in that they make it possible to optimize the aerodynamic flow of the fluid stream, taking into account the particularities of the flow precisely in the different air gaps, these particularities being able to change from air gap to air gap. They also make it possible to optimize the aerodynamic flow of the fluid stream under the most unfavorable conditions of manufacturing and assembly tolerances.

DETAILED DESCRIPTION

In the following description, the notions of "inner" and "outer" refer to the radial direction with respect to the main axis of the turbomachine. The notion of "inner" expresses a closer position of the axis in question compared to the notion of "outer" and vice versa.

Figure 1:
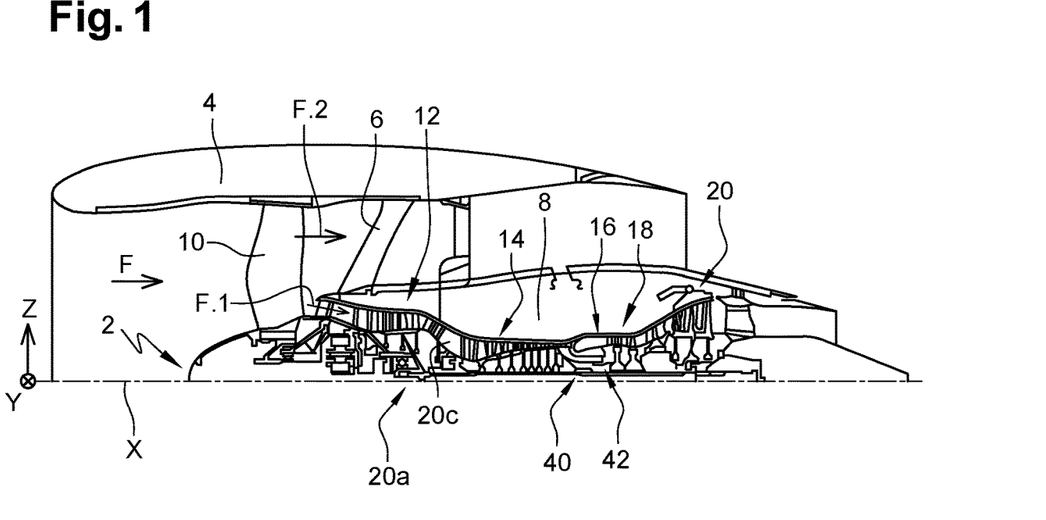
FIG. 1 is an exemplary longitudinal sectional view of a turbomachine in accordance with various embodiments of the invention.

FIG. 1 is a longitudinal sectional view of an axial turbomachine forming a jet thruster for aircraft. The turbomachine 2 is housed inside an outer nacelle 4 via guide vanes 6 and holding arms (not shown). The latter provide rigid attachment between the nacelle 4 and the casing 8 of the turbomachine 2. The latter essentially comprises, from upstream to downstream along the main axis X of the machine, a fan 10, more commonly designated "turbofan", a low-pressure compressor 12, a high-pressure compressor 14, a combustion chamber 16, a high-pressure turbine 18 and a low-pressure turbine 20. The air flow F entering the nacelle 4, upstream of the turbomachine 2, is divided into two air flows F.1 and F.2 after the fan 10, namely into a primary flow F.1 forming an annular fluid stream circulating inside the turbine engine 2, and a secondary flow F.2 also forming an annular fluid stream concentric with the primary flow F.1, delimited by the casing 8 of the turbine engine 2 and the internal wall of the nacelle 4. The primary flows F.1 and secondary F.2 join at the exit of the turbomachine 2. This architecture of turbomachine is well known to those skilled in the art and does not require further explanation.

The low-pressure 12 and high-pressure 14 compressors consist of alternating moving parts and fixed parts, more particularly of alternating rows of rotor blades and rows of stator blades. The rotor blades, or mobile, are mounted on a rotor of the turbine engine while the stator blades, or fixed, are mounted on the casing 8 of the turbine engine. For this purpose, the inner surface for guiding the fluid stream of the primary flow F.1 is formed by alternating mobile and fixed annular platforms forming air gaps.

Figure 2:
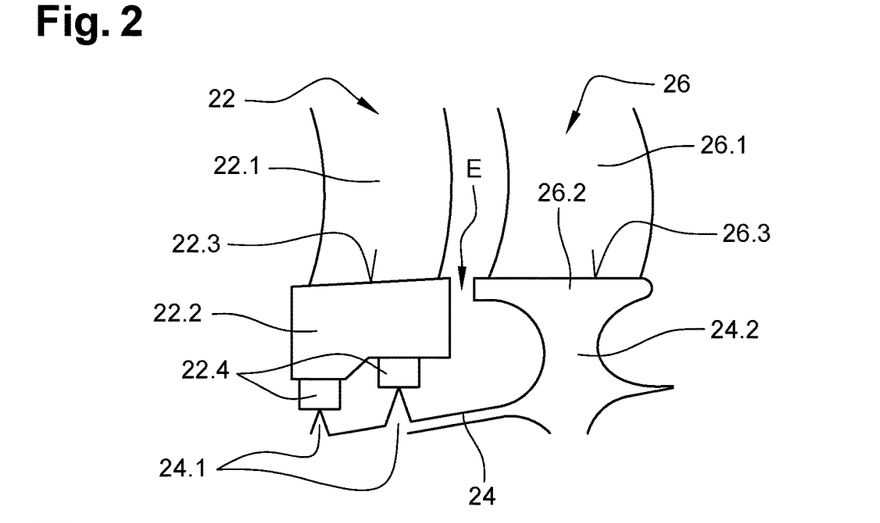
FIG. 2 is an exemplary detail view, in longitudinal section, of an air gap between a row of stator blades and a row of rotor blades in accordance with various embodiments of the invention.

FIG. 2 schematically illustrates an air gap E between a row 22 of stator blades 22.1, commonly referred to as stator row 22, and a row 26 of rotor blades 26.1, commonly referred to as row or rotor wheel 26. The stator row 22 comprises a inner shroud 22.2 forming an annular platform with an outer longitudinal profile 22.3. The inner shroud 22.2 supports on an inner face rotating sealing means 22.4 with wipers 24.1 formed on the rotor 24. The rotor row 26 comprises the rotor blades 26.1 supported by the rotor 24. The latter comprises in this case a protrusion ring 24.2 forming or supporting the inner platform 26.2 having an outer longitudinal profile 26.3 generally aligned with the outer longitudinal profile 22.3 of the platform 22.2 of the stator row 22. The air gap E is formed by the mechanical axial clearance between the adjacent edges of the platforms 22.3 and 26.3, in this case between the downstream edge of the platform 22.2 and the upstream edge of the platform 26.2.

Figure 3:
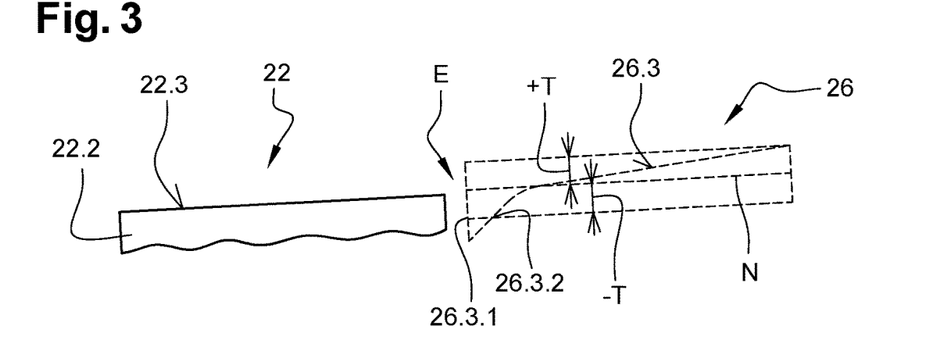
FIG. 3 is an exemplary schematic representation of tilting of the inner surface for guiding the fluid stream, taking into account manufacturing tolerances in accordance with various embodiments of the invention.

FIG. 3 schematically illustrates the influence of manufacturing and assembly tolerances on the alignment between these adjacent platforms. The platform 22.2 of the stator row 22 of FIG. 2, with its upper longitudinal profile 22.3, is illustrated schematically. The nominal profile N of the platform of the rotor row 26 is shown in broken lines (center line). This profile is perfectly aligned with that of the upstream stator row. The extreme positions of this theoretical profile are represented by a dotted line, corresponding to the tolerances +T and −T. It is then observed that in the case of the upper tolerance +T, the profile forms a rising step, which is particularly unfavorable from an aerodynamic point of view. Indeed, the aerodynamic losses of a protruding rising step are twice as great as the aerodynamic losses of a descending step of the same amplitude. Also, the aerodynamic losses of a rising step with a rounding or a chamfer are greatly reduced compared to the aerodynamic losses of a rising and projecting step (that is to say without rounding or chamfer). In accordance with the invention, provision may then be made to incline the profile 26.3 inwards and upstream with respect to the nominal profile N and optionally to provide a rounding or a chamfer, 26.3.2, at its upstream edge 26.3.1, so that at the maximum manufacturing and assembly tolerances, in this case +T, the profile 26.3 does not form a rising step. The inclination of the profile inwards and upstream consists, starting from a nominal profile, in making the upstream edge descend in relation to the downstream edge. It is however understood that the profile is not necessarily rectilinear and also that the inclination in question is not necessarily a rotation of the nominal profile. Indeed, the shape of the profile, in this case its curvature, can be modified to effectively lower the upstream edge.

What has just been described in relation to FIG. 2 and more particularly FIG. 3 also applies to the upper longitudinal profile of the platform of a stator row arranged directly downstream of a rotor row.

Figure 4:
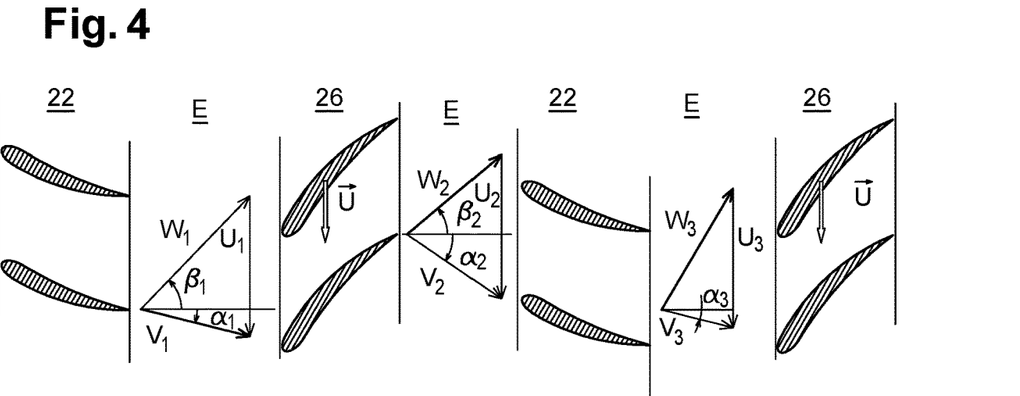
FIG. 4 is an exemplary schematic representation of the velocity vectors of the fluid stream in the air gaps between the rows of stator and rotor blades in accordance with various embodiments of the invention.

FIG. 4 is a schematic representation of the fluid stream velocity vectors in the air gaps between rows of stator and rotor blades, illustrating the absolute and relative velocities (i.e., in a reference frame rotating with the rotor). In FIG. 4 are represented two alternations of a row of stator blades and a row of rotor blades, in this case a stator row 22, followed by a rotor row 26, followed by a stator row 22, followed by a rotor row 26. For reasons of clarity of presentation of the invention, the stator rows all have the same reference sign 22, it being however understood that these rows are not identical but may have common characteristics relating to the present invention. The same applies to rotor rows with reference sign 26.

In FIG. 4, the absolute speed vector $V_1$ of the air flow at the exit of the first stator row 22 can be observed. This vector is oriented essentially along the chord of the profile of the blade upstream; it has an inclination $\alpha_1$ with respect to the axial direction, more precisely the direction located in an axial plane and tangent to the upper longitudinal profile of the annular platform 22. This direction corresponds to the axial direction if the fluid stream is perfectly cylindrical, this which is not necessarily the case. If we take the point of view of the rotor row 26 directly downstream, where the platform rotates at a speed U, the fluid flow follows the speed vector $W_1$. This relative speed vector $W_1$ of the air flow entering the rotor row 26 corresponds to the vector $V_1$ from which the vector $U_1$ has been subtracted and has an inclination $\beta_1$ with respect to the axial direction, which is opposite to the angle $\alpha_1$ and is substantially greater. The physical displacement of the air flow in the air gap E (substantially exaggerated in FIG. 4) from the stator row 22 towards the rotor row 26 corresponds to the vector $V_1$, that is to say in a fixed frame, while this same flow has a speed vector $W_1$ relative to the blades of the rotor row 26, substantially different from $V_1$.

Still with reference to FIG. 4, the flow of air leaving the rotor row 26 mentioned above (the one on the left) has a relative speed vector with respect to the row, $W_2$, essentially oriented along the chord of the profile blades of the row in question, and forming an angle $\beta_2$ with respect to the axial direction. If we add to it the velocity vector $U_2$ of the rotor row 26 corresponding to U and $U_1$, we obtain the absolute velocity vector $V2$ of the air flow, forming an angle $\alpha_2$ with the axial direction, in the occurrence opposite to the angle $\beta_2$. It is however the rotor row 26 which distributes the fluid in the air gap E and it is therefore necessary to consider the velocity vector $W_2$ of the fluid in a relative frame, fixed with the rotor row in question, to determine the distance traveled by the fluid in the air gap E.

Still with reference to FIG. 4, the flow of air leaving the second stator row 22 (on the right) located directly in front of the rotor row 26 mentioned above, has an absolute speed vector $V_3$ forming an angle $\alpha_3$ with the axis of the turbomachine, similarly to the vector $V_1$ and the angle $\alpha_1$ at the output of the first stator row 22. The relative speed of the fluid with respect to the rotor row 26 located directly downstream is represented by the vector $W_3$. Similar to what was detailed above in relation to the first stator row 22 (on the left in the figure), the absolute velocity vector $V_3$ should be considered to determine the distance traveled by the fluid in the air gap E.

In summary, the flow of the fluid in an air gap E between a fixed part 22 and a moving part 26 of the turbomachine is not necessarily axial but indeed inclined according to the angles $\alpha_1$, $\beta_2$ and $\alpha_3$ mentioned above in relation to FIG. 4. These angles are potentially large and significantly affect the distance traveled by the fluid in the air gap.

However, a flow of fluid not guided by a wall, which is precisely the case in the air gap, will tend not to follow the direction of the tangent of the downstream edge of the upstream platform. The flow will tend to penetrate into the air gap, in the radial direction towards the axis of the turbomachine. Consequently, the greater the path of the flow in the air gap, the more the flow will be deflected radially in the air gap and therefore the greater will be the need for inclination of the upper longitudinal profile of the annular platform and/or rounding or chamfer of the upstream edge.

At the exit of the fixed part 22, the absolute speed vector should be considered and at the exit of the mobile part 26, the relative speed vector should be considered, that is to say in a frame of reference rotating with the mobile part. For air gaps with greater inclinations and therefore longer routes, the upper longitudinal profile of the platform downstream of the air gap should be more inclined in order to minimize the risk of a rising step.

It is understood that the angles of inclination of the flow of fluid in the air gaps are not constant over the entire speed and load range of the turbomachine. It is therefore appropriate to consider one or more specific operating points of the turbomachine as for example one or more critical operating points for the specific consumption of the turbomachine and/or the operability of the compressor of the turbomachine.

Figure 5:
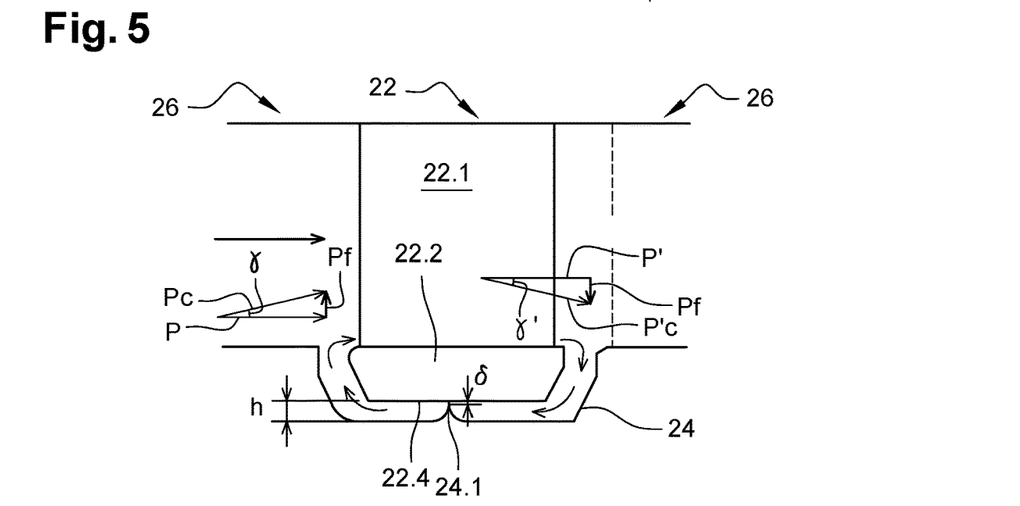
FIG. 5 is an exemplary schematic representation in longitudinal section of a row of stator blades, illustrating air recirculation in the rotary joint with the rotor in accordance with various embodiments of the invention.

FIG. 5 illustrates another phenomenon influencing the flow of fluid in the air gap at the exit of the fixed part, namely the leakage flow circulating under the platform of the stator row 22. Indeed, the sealing between a row of stator blades 22 and the rotor 24 is not perfect in that a certain leakage rate takes place between the wiper blades 24.1 of the rotor 24 and the rotating sealing means 22.4 on an inner face of the platform 22.2. This flow rate essentially depends on the pressure difference between the upstream and downstream of the row of stator blades 22 and the clearance δ at the level of the rotating sealing means. This flow enters the downstream air gap, crosses the cavity of the rotor 24 and opens into the upstream air gap essentially perpendicular to the fluid stream and thus modifies the orientation of the flow in a longitudinal plane passing through the axis of the turbomachine, and this in an opposite way upstream and downstream.

Upstream, the leakage flow leaving the cavity is added to the flow of the fluid vein and deflects it upwards. This angle of deviation γ can be calculated by adding the momentum of the fluid P before this leak rate and the momentum of the leak rate $P_f$. Momentum is a vector quantity equal, for a fluid flow, to the velocity vector multiplied by the mass flow rate. The corrected momentum of the fluid after the leakage rate, $P_c$, is then equal to $P+P_f$. From this relation, we can deduce the angle γ.

Similarly, downstream, the leakage flow entering the cavity is added to the flow of the fluid stream and deviates it downwards by an angle γ', which to a first approximation is equal to the angle γ. The angle γ' can also be obtained by adding the respective quantities of movement P' and $P_f'$ to obtain the corrected quantity of movement of the fluid after the leakage rate $P_c'$. This calculation method is an example, it being understood that other methods, in particular computer simulation, can be used.

The fluidic flow at the exit of a stator row 22 therefore has an azimuthal inclination directed inwards, making it necessary to provide a greater inclination of the rotor platform directly downstream, in comparison with a stator platform.

Figure 6:
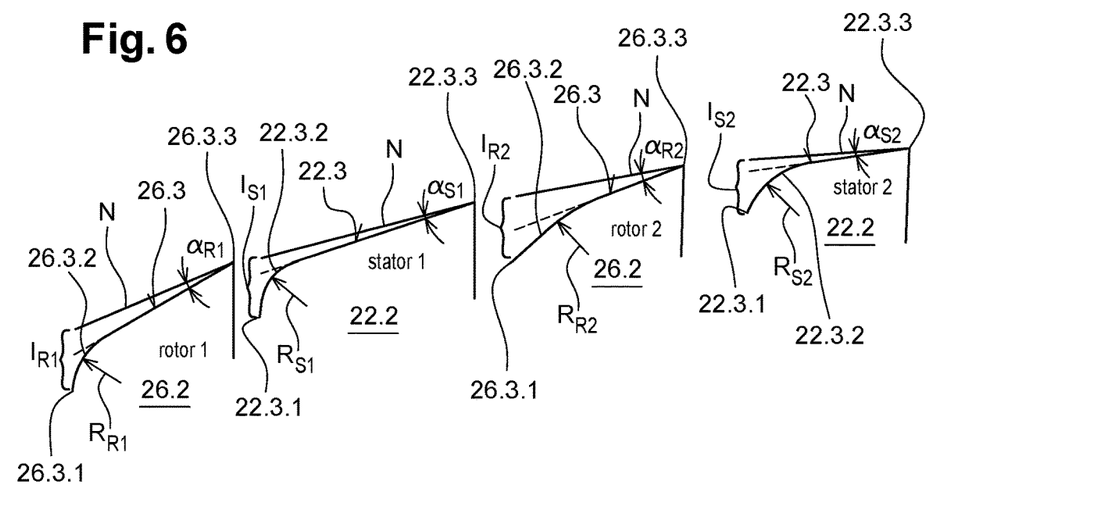
FIG. 6 is an exemplary schematic representation of tilts or inclinations of the inner surface for guiding the fluid stream in accordance with various embodiments of the invention.

FIG. 6 illustrates the outer longitudinal profiles 22.3 and 26.3 of the platforms 22.2 and 26.2 of successive stator and rotor rows, these profiles being corrected so as to optimize the flow of fluid, taking into account, on the one hand, manufacturing tolerances and assembly and, on the other hand, of the phenomena described above in relation to FIGS. 4 and 5. These profiles 22.3 and 26.3 are the theoretical profiles and have an inclination $I_{Si}$ and $I_{Ri}$ (i being an integer positive corresponding to the number of a stator or rotor row) upstream and inward with respect to the nominal profiles N. These inclinations $I_{Si}$ and $I_{Ri}$ express a distance of radial lowering of the upstream edge 22.3.1 and 26.3.1 relative to the nominal profile N. These inclinations can be obtained by rotating the outer longitudinal profiles 22.3 and 26.3 through an angle $\alpha_{Si}$ and $\alpha_{Ri}$ around the downstream edge 22.3.3 and 26.3.3. They can also be obtained by forming roundings 22.3.2 and 26.3.2, in this case circular arcs of radius of curvature $R_{Si}$ and $R_{Ri}$ (i being a positive integer corresponding to the number of a row stator or rotor) to the upstream edges 22.3.1 and 26.3.1 of the outer longitudinal profiles 22.3 and 26.3. In the light of what has been detailed in relation to FIG. 2, the manufacturing and assembly tolerances have the effect, in practice, that the real profiles, that is to say on the turbomachines produced and assembled on based on these theoretical profiles, will deviate from the theoretical profiles within the tolerances in question, the most unfavorable case being when the real profile is at the maximum of the tolerances towards the outside so as to form a rising step. The inclinations illustrated in FIG. 6 are therefore dimensioned to minimize aerodynamic losses in these adverse conditions within the limits of manufacturing and assembly tolerances as well as the particularities of the flow in the fluid stream as illustrated in relation to the FIG. 5.

It is observed in FIG. 6 that the outer longitudinal profiles 26.3 of the platforms 26.2 of rotor rows have an inclination $I_{R1}$ and $I_{R2}$ greater than the inclination $I_{S1}$ and $I_{S2}$ of the outer longitudinal profiles 22.3 of the platforms 22.2 of stator rows, essentially due to the fact that the flux in the air gaps directly upstream of the rotor rows are deflected inwards (azimuth angle γ' in FIG. 5) and, similarly, the flux in the air gaps directly upstream of the stator rows are deflected towards outside (azimuth angle γ in FIG. 5). The inclinations of the flow due to the orientations of the blades, as mentioned in relation to FIG. 4 (namely the angles $\alpha_1$, $\beta_2$ and $\alpha_3$) can influence this tendency by intensifying it or decreasing it. Indeed, with reference to FIG. 4 described previously, it can be observed that the angle $\beta_2$ is greater than the angles $\alpha_1$ and $\alpha_3$ (in absolute value, that is to say without consideration of the positive or negative sign of the angle with respect to the main axis), which means that, for air gaps of the same size, the path of the flux leaving the rotor row 26 is greater than the path of the flux leaving the stator rows 22. In this case, the inclination at the upstream edge of the outer profile of the platform of the stator row 22 directly downstream of this rotor row 26 in question will be increased. The angles of inclination $\alpha_1$, $\beta_2$ and $\alpha_3$ illustrated in FIG. 4 are however illustrative in that they can take other values, in particular the angles of inclination of the flow at the exit of certain rotor rows can be greater at the angles of inclination of the flow at the exit of certain rotor rows.

Figure 7:
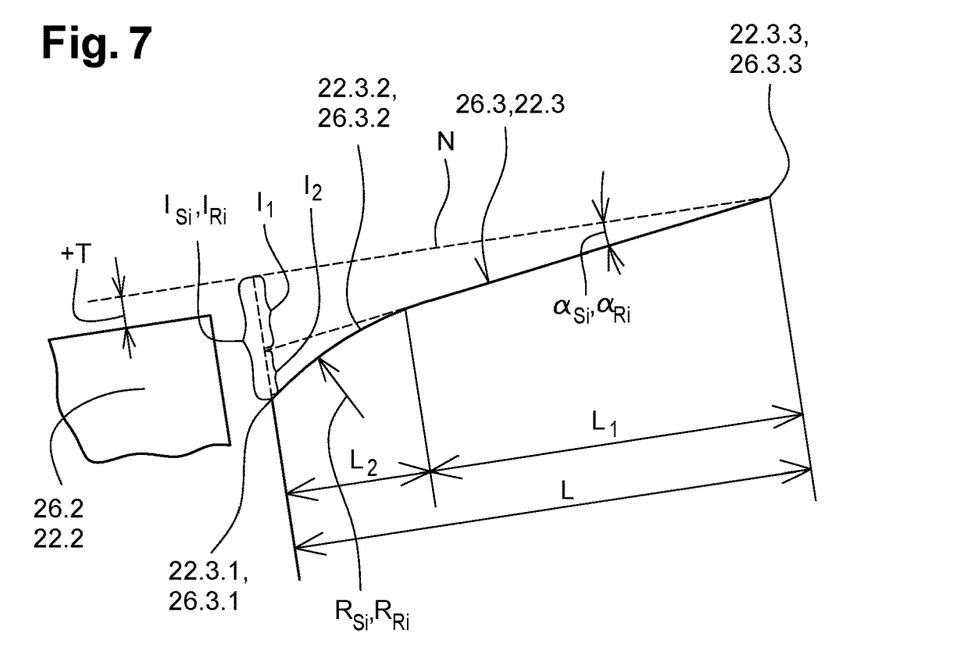
FIG. 7 is an exemplary detailed geometric representation of the inclination of the upper longitudinal profile of an annular platform of a row of stator or rotor blades in accordance with various embodiments of the invention.

FIG. 7 is a detailed and profile representation of the inclination of an upper longitudinal surface of an annular stator or rotor platform. The figure shows, on the left, the downstream edge of an annular rotor 26.2 or stator 22.2 platform; and, on the right, the upper longitudinal surface 22.3 or 26.3 of an adjacent stator 22.2 or rotor 26.2 platform. The nominal profile N, already mentioned in FIGS. 3 and 6, is shown there in dotted lines taking into account a manufacturing and/or assembly tolerance +T having the effect of raising the upper longitudinal surface 22.3 or 26.3 with respect to the upper longitudinal surface of the rotor 26.2 or stator 22.2 row located directly upstream. It can be observed that the upper longitudinal surface 22.3 or 26.3 comprises a first portion, in this case the main one, corresponding to a rotation of the nominal profile N around the downstream edge 22.3.3 or 26.3.3 by an angle $\alpha_{Si}$ or $\alpha_{Ri}$, and a second portion corresponding to the rounding 22.3.2 or 26.3.2, in this case an arc of a circle with a radius $R_{Si}$ or $R_{Ri}$. The first portion is advantageously tangent to the second portion. The rounding 22.3.2 or 26.3.2 extends, in the main direction of the fluid stream, over a distance $L_1$ corresponding to a fraction of the total length L of the upper longitudinal surface 22.3 or 26.3, the fraction possibly including between 20 and 30%. The main portion of the upper longitudinal surface 22.3 or 26.3, for its part, extends over a length $L_2$ corresponding to the rest of the total length L of the upper longitudinal surface 22.3 or 26.3. It can be observed that the inclination $I_{Si}$ or $I_{Ri}$ is the sum of two partial inclinations, namely a partial inclination $I_1$ resulting from the rotation of the nominal profile N and a partial inclination $I_2$ resulting from the rounding 22.3.2 or 26.3.2. Each of these partial inclinations $I_1$ and $I_2$ corresponds to a fraction of the inclination $I_{Si}$ or $I_{Ri}$, advantageously between 40 and 60%, where $I_1+I_2=I_{Si}$ or $I_{Ri}$.

Figure 8:
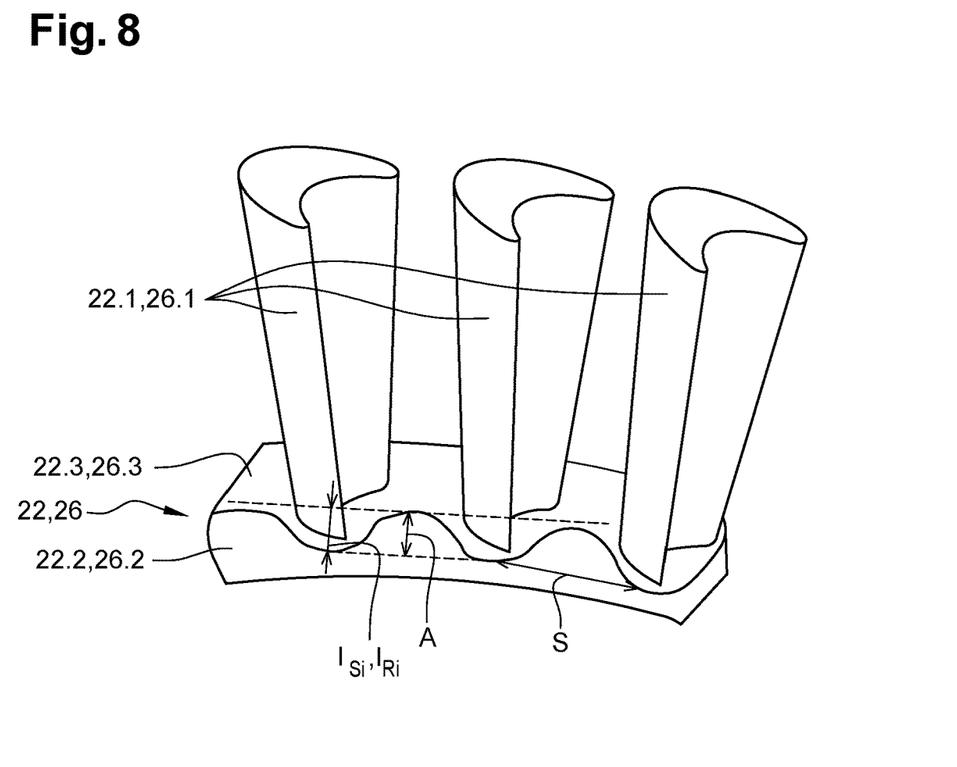
FIG. 8 is an exemplary schematic representation of cyclic variations of the tilting of the platform of a row of stator or rotor blades, in accordance with various embodiments of the invention.

FIG. 8 is a representation of a stator 22 or rotor 26 row segment of the turbomachine, in accordance with the invention. With reference to what has been described in relation to FIG. 6, the upper longitudinal profile 22.3 or 26.3 of the platform 22.2 or 26.2 of the stator 22 or rotor 26 row is inclined upstream and inwards. In FIG. 8, the upward and inward inclination $I_{Si}$ or $I_{Ri}$ of the upper longitudinal profile 22.3 or 26.3 of the platform 22.2 or 26.2 oscillates cyclically along the circumference of the platform, between a maximum value of inclination at the level of the blades 22.1 or 26.1 and a minimum value of inclination between the blades in question. This cyclic variation of the inclination, of amplitude A and period S, makes it possible to take into account the azimuthal heterogeneity of injection and withdrawal of the leakage flow in the air gaps in front of the stator and rotor rows, due to the presence of dawns. Indeed, the obstruction generated by the blades directly downstream of an air gap generates a flow blocking effect favoring a flow entering the air gap, precisely in front of the blades. Outside these zones, the flow has a greater tendency to rise in the vein compared to the average flow. It is thus advantageous to tilt the upper longitudinal profile of the platforms more in the zones subject to this blocking effect, namely in front of the blades. This then results in an oscillating inclination, in various instances cyclically, along the platform in its circumferential direction. This is equally valid for the rotor and stator rows, the blocking phenomena however possibly being different from one row to another, depending in particular on the orientation and the size of the blades.

It should be noted that the oscillating and cyclic inclination detailed above can be implemented independently of manufacturing tolerances and the influence of leakage recirculation under the annular stator platforms, as detailed in relation to FIG. 5, because the phenomenon of azimuthal heterogeneity of injection and withdrawal of the leakage flow in front of the annular stator and rotor platforms is a phenomenon which is not directly linked to the problem of upward running between two adjacent annular platforms resulting from manufacturing tolerances and assembly, nor even to the influence of leakage recirculation. This means that the minimum inclination value, between the blades, can be zero. Conversely, this minimum value of inclination $I_{Ri}$, between the blades of an annular rotor platform 26.2 can be non-zero and greater than the minimum value of inclination $I_{Si}$, zero or non-zero, between the blades of a platform annular stator 22.2, so as, moreover, on the one hand, to avoid an upward march due to the manufacturing and assembly tolerance and, on the other hand, to compensate for the effect of leakage recirculation at the stator level.

The alignment of the oscillating profile of the tilt with the blades can be adjusted according to the effective direction of the flow in the fluid stream in the air gap directly upstream of the blades concerned. Indeed, with reference to the discussion in relation to FIG. 4, the speed of the flow in the air gap is in principle not axial (more precisely the direction located in an axial plane and tangent to the upper longitudinal profile of the annular platform) but well inclined essentially following the profile of the blades which receive the flow. The points or zones of maximum inclination of the oscillating inclination profile can then be aligned with the leading edges of the blades following the profile of the blades, for example the chord lines of the blades. The same applies to the points or zones of minimum inclination which are aligned with the spaces between each pair of adjacent blades.

The amplitude of oscillation A of the inclination of the upper longitudinal profile 22.3 or 26.3 of the platform 22.2 or 26.2 of the stator row 22 or rotor 26, as illustrated in FIG. 8 can be greater than 0.05 mm and/or less than 0.15 mm. The pitch S of the oscillation is advantageously equal to a pitch of blades, that is to say the number of blades/$2\pi r$, where r is the internal radius of the fluidic stream.

It is however understood that these values may vary and potentially deviate from the aforementioned ranges. They depend on a certain number of parameters such as in particular the size of the turbomachine, the manufacturing and assembly tolerances, the distance between the air gaps and the flow conditions in the fluid stream (in particular the speed).

What is claimed is:

1. A set of compression stage(s) of a turbomachine, forming an annular fluid passage and comprising:
    at least one alternating row of stator and rotor blades, with annular platforms inside the fluid vein and delimiting the fluid vein;
    wherein at least one of at least one annular stator platform and at least one annular rotor platform has an outer longitudinal profile inclined inwards and upstream with respect to a nominal profile of the fluid stream; and
    wherein the inclination of the outer longitudinal profile of the or each of the annular platforms, relative to the nominal profile of the fluid stream, oscillates along the circumference of the annular platform(s), between a maximum value opposite the blades of the annular platform and a minimum value between each pair of adjacent blades of the annular platform.

2. The set of compression stage(s) according to claim 1, wherein the inclination of the outer longitudinal profile of the or each of the annular platforms, with respect to the nominal profile of the fluid stream is a radial distance $I_{Ri}$ and/or $I_{Si}$, respectively, at an upstream edge of the outer longitudinal profile, with respect to the nominal profile (N) of the fluid stream.

3. The set of compression stage(s) according to claim 2, wherein the maximum and minimum values of radial distance $I_{Ri}$ and/or $I_{Si}$ of inclination of the outer longitudinal profile of the or each of the platforms annular, compared to the nominal profile of the fluid stream, has a difference A comprised between 0.05 and 0.15 mm.

4. The set of compression stage(s) according to claim 1, wherein the inclination of the outer longitudinal profile of the or each of the annular platforms with respect to the nominal profile of the fluid stream is carried out by a pivoting of the outer longitudinal profile around a downstream edge of the outer longitudinal profile and/or by a rounding of the upstream edge of the outer longitudinal profile.

5. The set of compression stage(s) according to claim 4, wherein the rounding of the upstream edge of the outer longitudinal profile of the annular platform or platforms has a radius of curvature $R_{Ri}$ or $R_{Si}$, respectively, greater than 5 mm and less than 15 mm.

6. The set of compression stage(s) according to claim 4, wherein the rounding of the upstream edge of the longitudinal profile exterior of the or each of the annular platforms extends over a distance greater than 20% and less than 30% of the total extent of the outer longitudinal profile.

7. The set of compression stage(s) according to claim 1, wherein the inclination of the outer longitudinal profile of the or each of the annular platforms, relative to the nominal profile of the fluid stream, oscillates along the circumference of at least one annular stator platform and at least one annular stator platform, the minimum inclination of the outer longitudinal profile of the at least one annular rotor platform being greater than the minimum inclination of the outer longitudinal profile of the at least one annular stator platform, respectively.

8. The set of compression stage(s) according to claim 1, wherein the maximum value of the inclination of the outer longitudinal profile of the each of the annular platforms faces the blades of the annular platform along a line of chords of the blades.

9. A method for dimensioning at least one annular platform of a row of stator blades and/or of a row of rotor blades of a set of stages compression of a turbomachine, the rows of blades being alternately and forming air gaps, the method comprising, for the or each of the annular platforms, determining, as a function of the air gap directly upstream, an inclination of an outer longitudinal profile of the annular platform inwards and upstream with respect to a nominal profile of the fluid vein; wherein the inclination of the or each of the annular platforms oscillates along the circumference of the annular platform, between a maximum value in front of the blades of the annular platform and a minimum value between each pair of adjacent blades of the annular platform.

10. The method according to claim 9, wherein the maximum value of the inclination of the outer longitudinal profile of the or each of the annular platforms is aligned opposite blades of the annular platform following an orientation of the fluid stream in the gap directly upstream of the annular platform, at nominal operating speed.

* * * * *